United States Patent [19]

Tanigami et al.

[11] 4,059,087

[45] Nov. 22, 1977

[54] OIL PRESSURE DETECTING APPARATUS FOR INTERNAL COMBUSTION ENGINES

[75] Inventors: Takahiko Tanigami, Mito; Akira Hasegawa; Shigeru Horikoshi, both of Katsuta, all of Japan

[73] Assignee: Hitachi, Ltd., Japan

[21] Appl. No.: 672,144

[22] Filed: Mar. 31, 1976

[30] Foreign Application Priority Data

Apr. 4, 1975 Japan .................................. 50-40291

[51] Int. Cl.$^2$ .......................... F01M 1/00; F01M 1/04
[52] U.S. Cl. ............................. 123/196 S; 123/196 R; 184/6.4; 184/6.5
[58] Field of Search ..................... 123/196 R, 196 S; 184/6.4, 6.5; 73/116

[56] References Cited

U.S. PATENT DOCUMENTS

| 2,499,319 | 2/1950 | Lillquist | 123/196 S |
| 3,561,565 | 2/1971 | Woor | 123/196 S |

Primary Examiner—Ronald H. Lazarus
Attorney, Agent, or Firm—Craig & Antonelli

[57] ABSTRACT

An oil pressure detecting apparatus for an internal combustion engine comprises an LC oscillator having an inductance variable in dependence upon variation in the oil pressure of the engine. The frequency or voltage of an output signal of the oscillator is compared with that of a reference signal having a predetermined relation to the number of revolutions of the engine, thereby to determine if the oil pressure is within an acceptable range.

4 Claims, 11 Drawing Figures

OIL PRESSURE DETECTING APPARATUS FOR INTERNAL COMBUSTION ENGINES

BACKGROUND OF THE INVENTION

1. Field of the Invention

The present invention relates to an apparatus for detecting oil pressures and in particular to an oil pressure detecting apparatus which can be advantageously employed for an alarm system for indirectly monitoring an amount of oil in a Diesel engine.

2. Description of the Prior Art

In systems for detecting oil pressures particularly of internal combustion engines there has heretofore been known a so-called pressure switch having contacts which are adapted to be actuated mechanically by means of a bellows and a spring. It is also known to use a semiconductor strain gage for the same purpose. However, the pressure switch has a drawback that it can be used only for detecting a specific point of value of oil pressure. On the otherhand, the semiconductor strain gage is disadvantageously subjected to restriction in respect to the locations at which the gage is used due to the inherent temperature characteristic thereof. Further, the semiconductor strain gage is very expensive.

SUMMARY OF THE INVENTION

An object of the invention is to provide an oil pressure detecting apparatus which is heat-resistive and can be manufactured at low costs.

According to the feature of the invention, an electrical quantity such as inductance which varies in dependence upon variation in an oil pressure is converted into a correspondingly varied frequency or voltage which is then compared with a quantity predetermined as a function of the number of revolutions of an engine, thereby to determine if the detected oil pressure is in a suitable range.

DETAILED DESCRIPTION OF PREFERRED EMBODIMENTS

Figure 1:
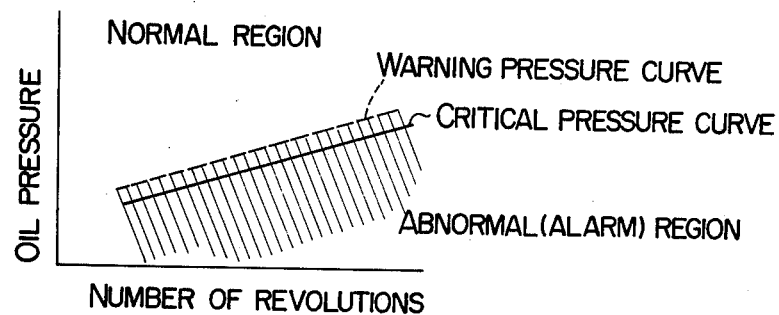
FIG. 1 is a graph for illustrating a relation between the number of revolutions of an engine and oil pressure of the engine.

In general, a minimum oil pressure or amount of oil at which burning or scorching of oil will occur in a running internal combustion engine is represented by a critical oil pressure curve indicated by a solid line in FIG. 1. In the range below this critical curve, there may arise a danger that the burning of oil may occur in the engine.

The critical oil pressure will vary in dependence on the number of revolutions of the engine. As the number of revolutions of the engine is increased, a higher pressure or increased amount of oil is required. According to the invention, an oil pressure which is slightly higher than the critical pressure value as indicated by a broken line curve shown in FIG. 1 is detected and utilized as a threshold of warning pressure below which a safty operation such as generation of an alarm or interruption of the engine operation is effected.

Figure 2:
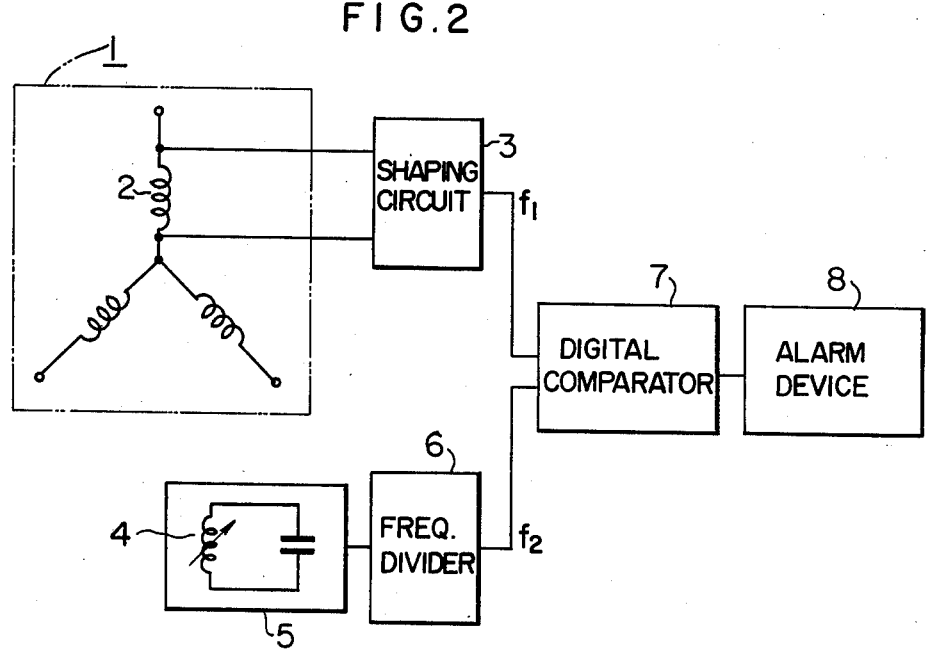
FIG. 2 is a block diagram showing an embodiment of the invention.

Referring to FIG. 2 showing an embodiment of an oil pressure detecting apparatus according to the invention, the apparatus comprises an a.c. generator 1, having field coils 2, for detecting the number of revolutions of the internal combustion engine. The a.c. generator 1 is adapted to be driven by the engine for charging a battery in a well known manner. The detection apparatus further comprises a wave-form shaping circuit 3 for shaping the wave form of the output voltage from the a.c. generator 1 and a variable inductance coil or pressure sensor 4 for sensing variations in the oil pressure. The sensor coil 4 is so set that its inductance decreases as the oil pressure is increased. Reference numeral 5 denotes an LC oscillator constructed in combination with the sensor coil 4. A frequency divider 6 is provided in order to make the frequency of the output of the oscillator 5 comparably match the frequency of the a.c. output from the a.c. generator 1. The outputs of the waveform shaping circuit 3 and the frequency divider 6 are connected to a digital comparator 7 which serves to compare the frequency $f_1$ of the output of the a.c. generator 3 with the frequency $f_2$ of the output of the frequency divider 6 and produce an output signal representing logic "1" when the frequency $f_2$ is lowered to a predetermined level higher than the level of the frequency $f_1$ by a predetermined value. Numeral 8 designates an alarm device for producing an alarm in response to the output from the digital comparator 7.

Figure 3:
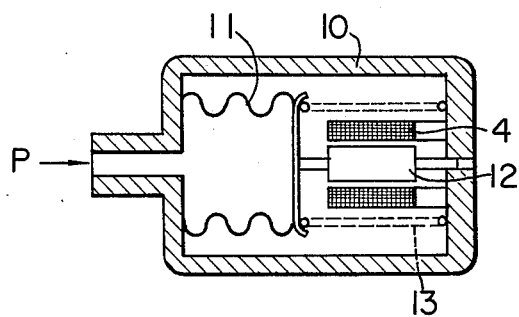
FIG. 3 is a schematic sectional view of a pressure sensor device used in the apparatus shown in FIG. 2 and constructed in a form of a pressure-to-inductance transducer.

The coil or pressure sensor 4 is incorporated in a pressure-inductance transducer such as shown in FIG. 3. The transducer comprises a bellows 11, a magnetic core 12 made of a ferrite material or the like, and a spring 13 for urging the bellows 11 to the left as viewed in the drawing. The device is shown in a position in which no oil pressure P is applied at a pressure inlet. In this position, the core 12 lies coaxially in the central portion of the coil 4 along its axis, and thus the inductance of the coil assumes a maximum value. When an oil pressure P is applied to the transducer as indicated by an arrow and progressively increased, the bellows 11 will be expanded against the force of the spring 13 accompanied by a rightward displacement of the core 12. This results in a reduction of the occupation ratio of the core 12 within the coil 4 and hence a decrease in the inductance of the coil 4.

Figure 4:
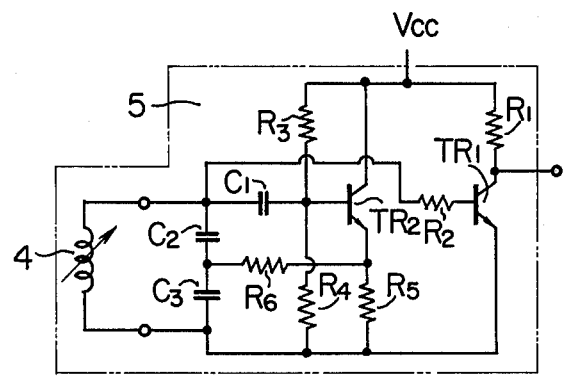
FIG. 4 is a circuit diagram showing an example of an oscillator used in the apparatus shown in FIG. 2.

The LC oscillator 5 may be composed of transistors TR1 and TR2, capacitors C1 to C3 and resistors R1 to R6 connected in a manner shown in FIG. 4. It will be readily appreciated that the oscillation frequency of the circuit 5 is increased, as the inductance of the coil 4 is decreased.

In the above embodiment, the apparatus is so preset that, so far as a normal oil pressure is presented at a certain number of revolutions of the engine, the frequency $f_2$ which is produced as a predetermined function of the oil pressure remains sufficiently higher than the frequency $f_1$ of the output from the a.c. generator 1. Accordingly, at the normal oil pressure, a logic "O" signal will appear at the output of the digital comparator 7. When the oil pressure P is decreased, the inductance of the coil 4 is correspondingly increased, which results in a decrease of the frequency $f_2$. If the frequency $f_2$ decreases below the predetermined level, the digital comparator 7 produces an output of logic "1" level, thereby operating the alarm device 8.

It will be understood from the above description that the pressure detecting apparatus can be operated digitally with an improved temperature characteristic. Further, the apparatus can be manufactured inexpensively with the number of circuit points requiring adjustments being remarkably decreased.

Figure 5:
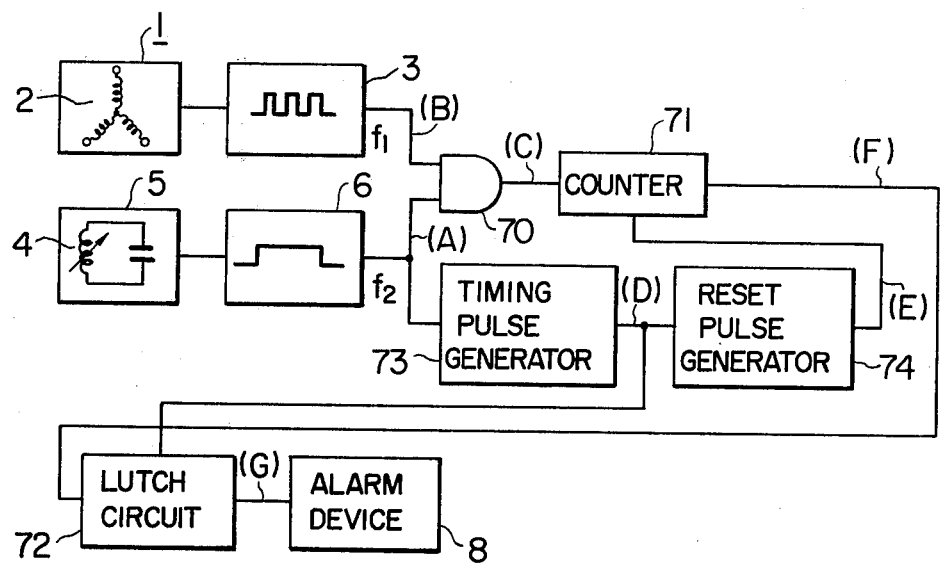
FIG. 5 shows in a block diagram another embodiment of the invention.

FIG. 5 shows another embodiment of the invention. The same circuit components as in the apparatus shown in FIG. 2 are denoted by the same reference numerals.

As will be seen from the figure, an AND gate 70, a counter 71, a latch circuit 72, a timing pulse generator 73 and a reset pulse generator 74 are provided at the input side of the alarm device 8.

Figure 6:
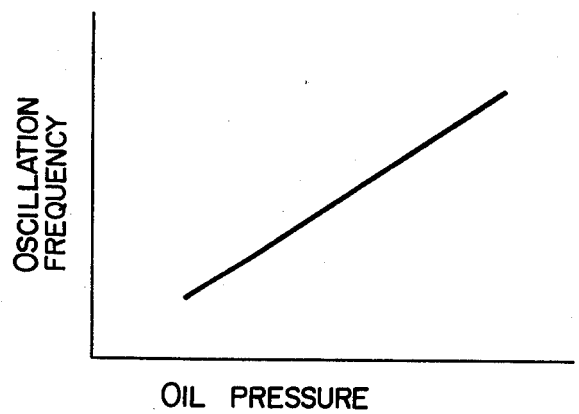
FIGS. 6 and 7 are graphs for explaining the operation of the apparatus shown in FIG. 5.
Figure 7:
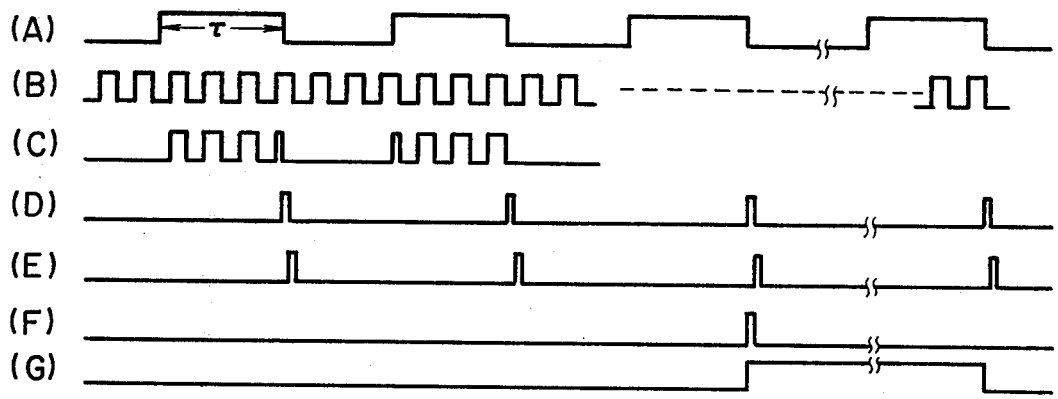

FIG. 6 illustrates the oscillation frequency of the oscillator 5 to the oil pressure, from which it will be seen that the oscillation frequency becomes higher, as the oil pressure is increased. FIG. 7 shows wave forms of signals at various points in the circuit shown in FIG. 5. Whether the oil pressure is appropriate or not is determined on the basis of the logic state "1" or "0" at the output of the counter 71.

The oscillator 5 produces a signal as shown in FIG. 7(A) having a frequency $f_2$ representative of the oil pressure presented in the engine. The signal shown in FIG. 7(B) having the frequency $f_1$ representative of the number of revolutions of the engine and the signal of the frequency $f_2$ proportional to the oil pressure are applied to the inputs of the AND gate 70, the output of which thus represents the number of pulses of the frequency signal $f_1$ appearing during a half period $\tau$ of the frequency signal $f_2$. This number of pulses is counted by the counter 71. The counter 71 is so constructed as to produce an output of logic "1" level when having counted a predetermined number of pulses. The timing pulse generator 73 produces timing pulses as shown in FIG. 7(D) in synchronism with the trailing edges of the signal shown in FIG. 7(A) representative of the oil pressure, and the reset pulse generator 74 produces reset pulses as shown in FIG. 7(E) in synchronism with the trailing edges of the timing pulses. The output of the counter 71 is fed to the latch circuit 72 in synchronism with the timing pulses. If the output of the counter 71 is at "0" level, the output of the latch circuit 72 is also at "0" level, while the latch circuit 72 produces an output of "1" level when the output of the counter 71 is at "1" level. The output of "1" level derived from the latch circuit 72 operates the alarm device 8. After the output of the counter 71 is fed to the latch circuit 72, the content of the counter 71 is cleared by the reset signals.

When the oil pressure of the engine is decreased, the period $\tau$ shown in FIG. 7(A) becomes longer and thus the number of pulses of the frequency signal $f_1$ appearing during the period $\tau$ is increased. When the increased number of pulses reaches the predetermined number of pulses to be counted by the counter 71, the counter 71 produces an output of "1"level which results in production of an alarm as described above. It will easily be understood that the number of pulses appearing during the period $\tau$ is alsoincresed when the number of revolutions of the engine is increased without a corresponding increase of the oil pressure. Thus, the same result is attained.

In the above-described embodiments, the oil pressure is converted into an inductance value which is then transduced into a frequency by means of an LC oscillator. However, it is alternatively possible to convert the variation of the oil pressure into a resistance variation which is then utilized to vary the frequency of an RC oscillator.

In the above description, it has been assumed that the detection apparatus functions to produce an alarm. However, it will be easily appreciated that another safety operation such as interruption of the engine operation may be carried out simultaneously with or independently from the generation of the alarm of an abnormal oil pressure.

Figure 8:
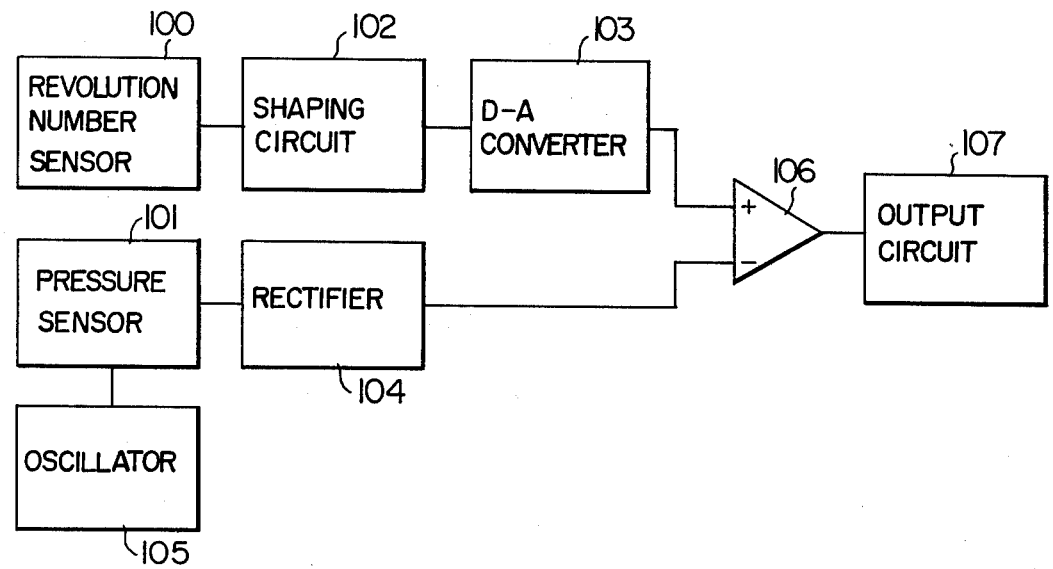
FIG. 8 is a block diagram showing still another embodiment of the invention.

FIG. 8 shows another embodiment of the invention in the form of a block diagram which are so arranged as to effect analog processing of signals representative of the number of revolutions of the engine and the oil pressure.

Figure 9:
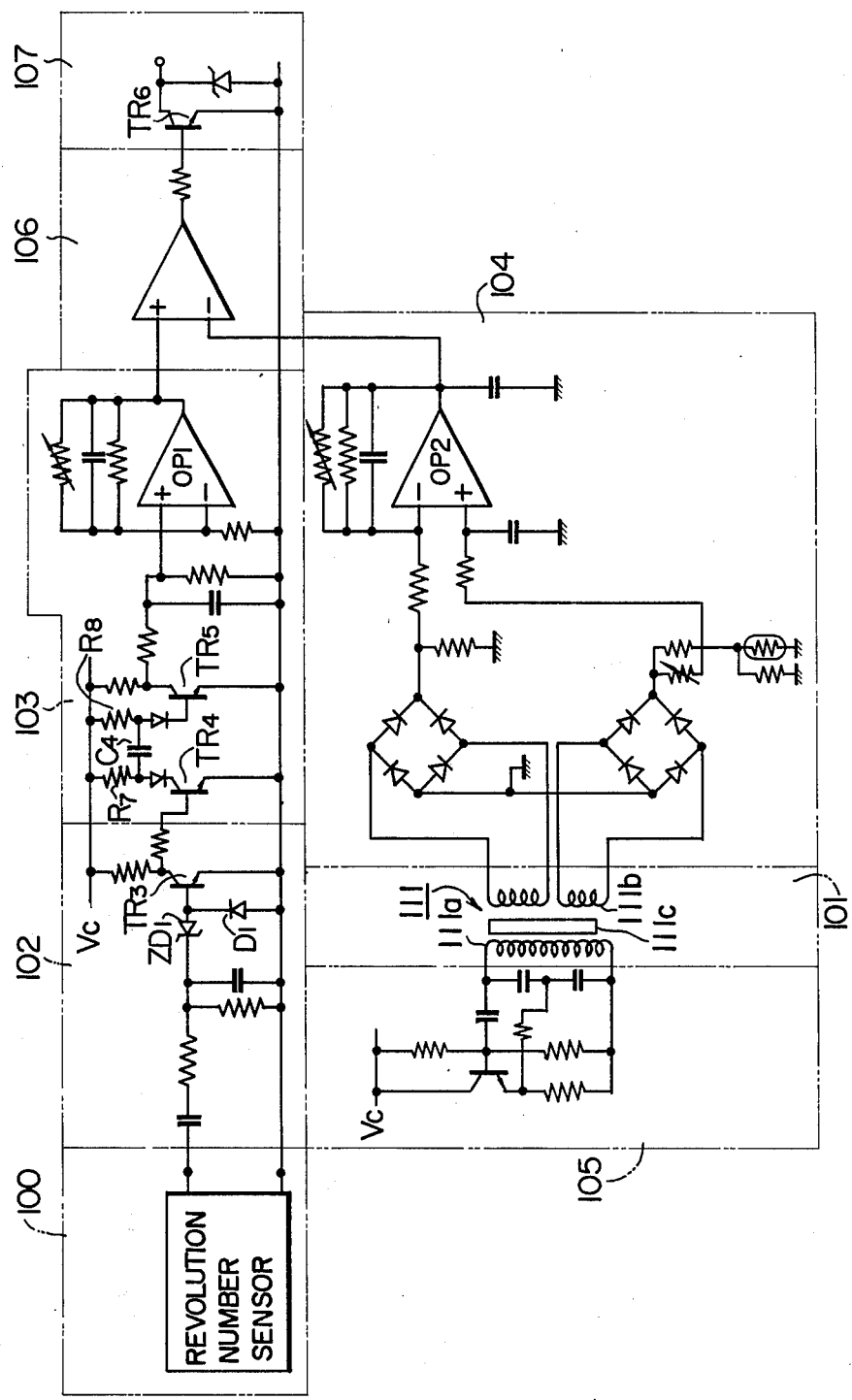
FIG. 9 is a circuit diagram for showing a detailed circuit arrangement of the apparatus shown in FIG. 8.

FIG. 9 shows a concrete circuit arrangement of the embodiment of FIG. 8. The neutral point terminal (N terminal) of a three-phase a.c. generator is utilized as a revolution number sensor 100 for delivering the signal representative of the number of revolutions of the engine. A wave-form shaping circuit 102 comprises a Zenar diode ZD1, a diode D1 and a transistor TR3, which effects wave-form shaping of an output from the N terminal containing ripple components. In a digital-to-analog or D-A converter 103, a rectangular output signal from the shaping circuit 102 is applied to the base of a transistor TR4, whereby the conductive and the non-conductive time durations of a transistor TR5 are controlled as a function of the frequency of the rectangular output signal from the shaping circuit 102. Namely, as the number of revolutions is increased, the conductive time duration of the transistor TR5 will become shorter and an output of an integrator circuit having an operational amplifier OP1 is increased. Thus, an analog voltage of a magnitude proportional to the frequency of the rectangular signal is applied to a plus (+) terminal of a comparator circuit 106.

On the other hand, an oil pressure sensor 101 in this embodiment for delivering the signal representative of the oil pressure may be composed of a differential transformer 111 having a primary winding 111a which is energized by an oscillation signal from an oscillator 105 and an iron or magnetic core 111c which is displaced in accordance with the variation in the oil pressure. An output from the differential transformer 101 which varies in proportion to the variation in the oil pressure is taken out from a secondary winding 111b and fed to a rectifier circuit 104 to be converted into an analog voltage through an integrator circuit including an operational amplifier OP2. The analog voltage is applied to the other input of the comparator 106.

Figure 10:
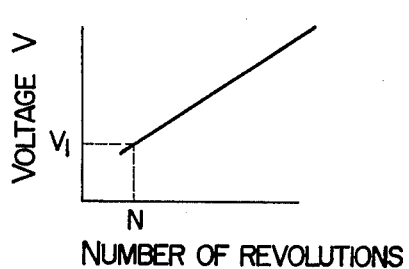
FIGS. 10 to 11 are graphs for explaining the operation of the apparatus shown in FIGS. 8 and 9.
Figure 11:
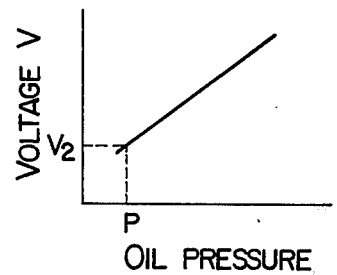

FIG. 10 shows an N-$V_1$ characteristic of the circuitry connected to the plus terminal of the comparator 106, in which N designates the number of revolutions of the engine and $V_1$ the output voltage from the D-A converter 103. The circuitry is so preset that the output voltage from the converter 103 represents the critical value of the oil pressure. FIG. 11 shows a P-$V_2$ characteristic of the circuitry connected to the minus terminal of the comparator 106, in which P designates the oil pressure in the engine and $V_2$ the output voltage from the rectifier 104. The output voltage from the rectifier 104 represents the actual oil pressure.

When the voltage $V_2$ is sufficiently higher than the voltage $V_1$, i.e. in the normal state of the oil pressure, the comparator 106 delivers no output. When the voltage $V_2$ is decreased to a value higher than that of the voltage $V_1$ by a predetermined value, the comparator 106 produces an output which is fed to a transistor TR6 in the output circuit 107, and thus the output level of the output circuit is inverted. The inverted output is utilized to actuate a suitable alarm device.

We claim:

1. An apparatus for detecting an oil pressure in an internal combustion engine, comprising:
   first means for detecting the number of revolutions of the engine and producing a first signal representative of a critical value of the oil pressure in accordance with the detected number of revolutions;
   second means for detecting the oil pressure and producing a second signal representative of an actual oil pressure in accordance with the detected oil pressure; and
   third means for comparing the first signal with the second signal and producing an output when the second signal is smaller than a predetermined level.

2. An apparatus as claimed in claim 1, wherein said first means comprises an a.c. generator driven by the engine and a wave-form shaping circuit for shaping the wave-form of an output of the generator so that said first signal is given in terms of frequency, and said second means comprises an oscillator including an inductance variable in accordance with variation in the oil pressure so that said second signal is given in terms of frequency, and said third means comprises a digital comparator for comparing said two frequencies with each other.

3. An apparatus as claimed in claim 1, wherein said first means comprises an a.c. generator driven by the engine and a wave-form shaping circuit for shaping the wave-form of an output of the generator so that said first signal is given in terms of frequency, and said second means comprises an oscillator including an inductance variable in accordance with variation in the oil pressure so that said second signal is given in terms of frequency, and said third means comprises an AND circuit receiving said first and second signals for producing pulses in accordance with the logical product of said first and second signals, a counter receiving the pulses produced from the AND circuit for producing an output when having counted a predetermined number of pulses and reset means for resetting said counter at a predetermined time in accordance with said second signal.

4. An apparatus as claimed in claim 1, wherein said first means comprises an a.c. generator driven by the engine, a wave-form shaping circuit for shaping the wave-form of an output of the generator and a D-A converter for producing an analog voltage proportional to an output of the wave-form shaping circuit, whereby said first signal is given in terms of the analog voltage, and said second means comprises a differential transformer having a magnetic core movable in accordance with variation in the oil pressure, an oscillator connected with a primary winding of the transformer and a rectifier connected with a secondary winding of the transformer, whereby said second signal is given in terms of an analog voltage, and said third means comprises an analog comparator for comparing said two voltages with each other.

* * * * *